Sheet 1, 2 Sheets.

H. A. Harvey.
Screw-Blank Feeder.

Nº 42,476. Patented Apr. 26, 1864.

Witnesses:

Inventor:

THE GRAPHIC CO.PHOTO-LITH.39 & 41 PARK PLACE, N.Y.

Sheet 2, 2 Sheets.
H. A. Harvey.
Screw-Blank Feeder.
Nº 42,476. Patented Apr. 26, 1864.
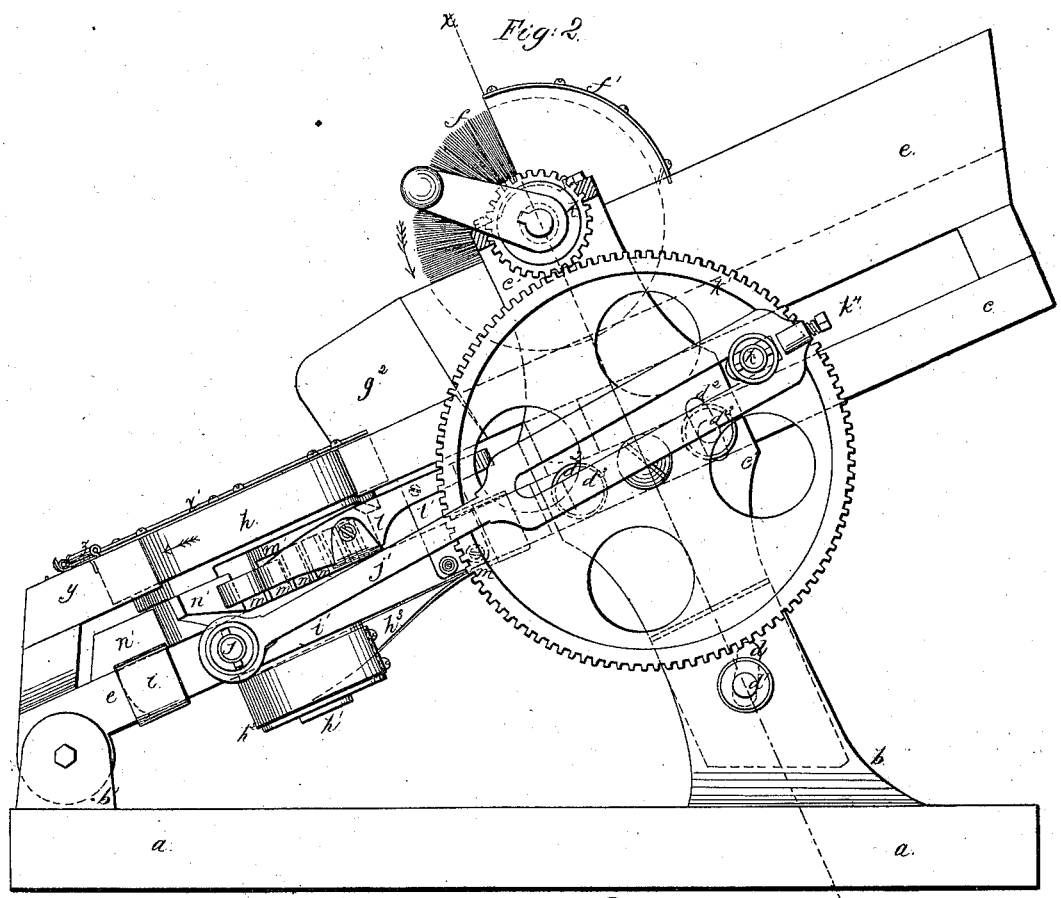
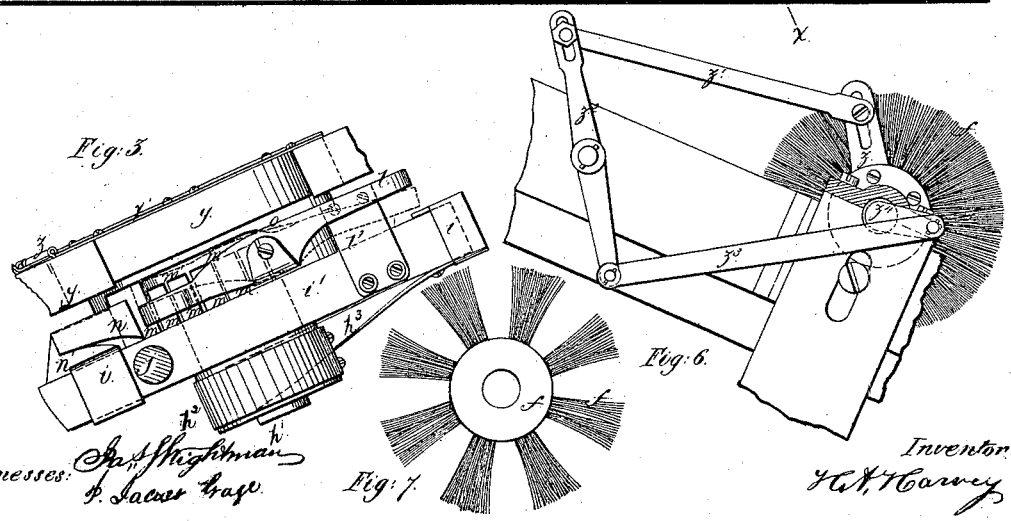
Witnesses:  
Inventor: H. A. Harvey
THE GRAPHIC CO. PHOTO-LITH. 39 & 41 PARK PLACE, N.Y.

UNITED STATES PATENT OFFICE.

H. A. HARVEY, OF NEW YORK, N. Y.

IMPROVEMENT IN APPARATUS FOR ARRANGING AND DISTRIBUTING SCREW-BLANKS.

Specification forming part of Letters Patent No. 42,476, dated April 26, 1864.

*To all whom it may concern:*

Be it known that I, H. A. HARVEY, of the city, county, and State of New York, have invented certain new and useful apparatus or machinery for arranging screw-blanks, pins, and like articles in rows and distributing and forwarding them to various machines, such as shaving, nicking, and threading machines, performing useful operations on such blanks; and I declare the following, taken in connection with the drawings, to be a full, clear, and exact description thereof.

Figure 1:
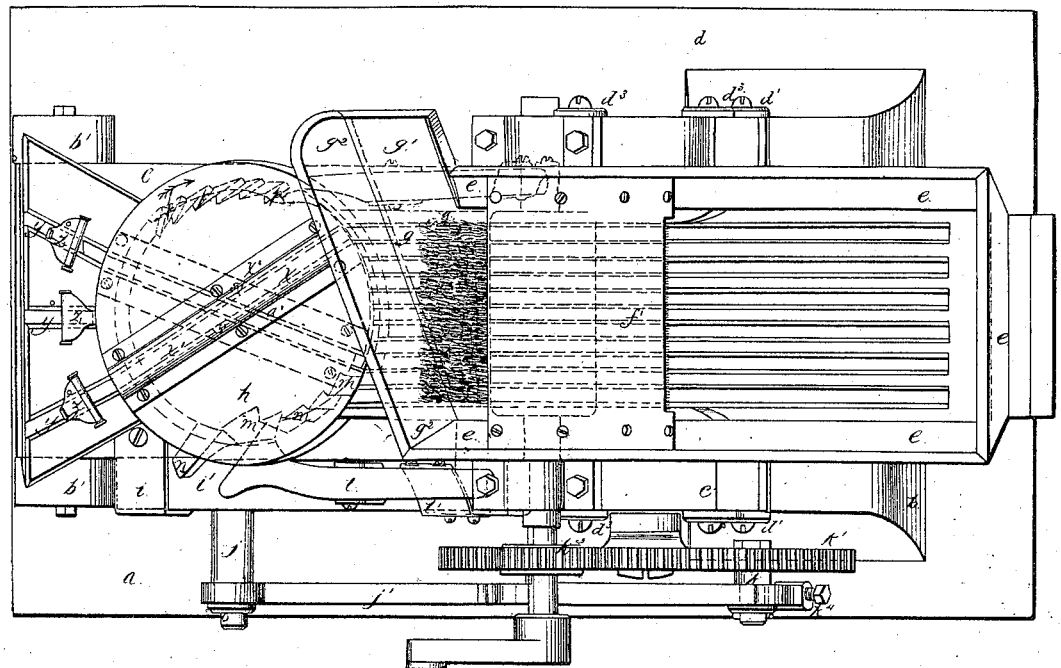
Figure 4:
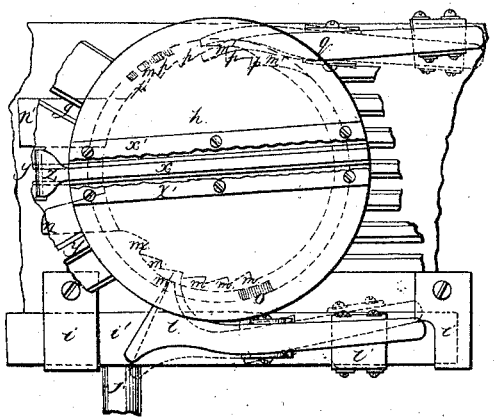

In the drawings, which represent a machine embodying the principles of my invention, Figure 1 is a top view or plan of the whole apparatus. Fig. 2 is a side elevation thereof. Fig. 3 is a side elevation, in detail, of the distributer and the mechanism which imparts motion to it. Fig. 4 is a plan thereof when its upper surface is placed horizontally. Fig. 5 is a section on the line $x x$ of Fig. 2. Fig. 6 is an elevation of a contrivance for imparting a reciprocating motion to the sweep, and Fig. 7 is an elevation of a modified construction of the brush.

The apparatus herein described divides itself naturally into three parts—viz., first, the mechanism for arranging blanks in rows with their heads uppermost, which I call the "arranger;" second, the machinery for receiving the blanks from such rows and distributing them to ways, which forward them to the various machines, which I call a "distributer;" and, third, the forwarding-ways leading to machines for performing operations on the blanks.

The distributing mechanism does not differ essentially in mode of operation from that described in another application for a patent made coincident with the present one and has the same object—viz., to distribute from a single arranger to forwarding-ways leading to several different machines; but in this application I describe a practical way of imparting to the distributer an oscillating motion, which motion, it is said in that application, may be applied to a distributer.

In the apparatus herein described the arranger is a trough-shaped receptacle having a bottom composed of slats or ribs, between which columns of screw-blanks can hang, the bottom being inclined and the arrangement of the screws being aided by a sweep rotating or oscillating on a horizontal axis.

In the drawings, a bed-plate is shown at $a a$, from which project two sets of standards, $b b$ $b' b'$. To the latter standards, $b'$, a frame, $c$, is pivoted, and about the center of the frame two horns or lugs, $c' c'$, are attached, which bend inward and descend between the standards $b b$. These standards are slotted as at $d$, and clamping-screws $d' d'$ project through the slots into the lug, the whole arrangement being such that the frame can be set and maintained at such angles of inclination with the horizon as may make the machine work most efficiently. The frame itself is secured to the lugs by screws $d^3$, which pass through slots $d^2 d^2$, and thus the frame and hopper, next to be described, may be adjusted with reference to the lugs.

The hopper $e e$ is mounted upon the frame. It is an oblong box or trough-shaped receptacle with a bottom composed of slots or ribs having spaces between them a little greater in width than the diameter of the blanks to be arranged, the upper edges of the slats being beveled so that the heads of screw-blanks may drop below the upper surface of the ribs. The lower end of the hopper is closed by a sweep, $f f$, made of bristles, wire, or similar material, and mounted on a shaft supported by the lugs, so that it can be revolved or oscillated with the ends of the bristles in contact with the upper surface of the ribs, or nearly so, and the precise position of the sweep with reference to the upper surface of the ribs is determined by adjustment of the screws $d^3$ $d^3$. The ribs extend under the brush, and their ends are so formed and arranged that they may be all touched by a circular disk. The brush is covered in part by a guard, $f'$. A thin plate of metal, $g$, lies above the ribs and under the brush, and projects out sidewise at $g'$ beyond the receptacle for the blanks. Another piece, $g^2$, rises from the piece $g$ and abuts against the side of the receptacle. The precise shape of the bottom of the receptacle is unimportant, and the slots between the ribs may be curved instead of straight and inclined to each other.

The operation of this part of the contrivance is as follows: A mass of screw or other similar blanks is deposited in the receptacle either by hand or machinery, and many of them will, owing to the shape of the top of the ribs and their inclination, arrange them selves hanging by their heads. Those that do not arrange themselves will be beat upward and rolled over by the brush, and have other chances of dropping between the ribs. Those which by any accident pass the brush or sweep without being arranged will ride on top of the plate $g$, strike against the plate $g^2$, and will slide or roll out of the machine at $g'$, being thus discharged and prevented from obstructing the operation of the distributing-disk. The guard $f'$ will prevent blanks that may adhere to the brush from being carried upward, and the same guard will prevent blanks from being dropped on top of the brush. Those blanks which are arranged pass down in columns between the ribs under the discharging-plate $g$, and are arrested by the disk $h$, presently to be described. The brush or sweep may have an oscillating, instead of a continuous rotating, motion, and I have found in practice that the screws are more rapidly arranged when the brush oscillates. A convenient way of effecting the motion is shown in Fig. 6, where the brush is mounted on a sleeve upon its shaft, and has attached to it an arm, $z$, which, by means of a link, $z'$, is connected to a lever, $z^2$, which is reciprocated by a link, $z^3$, receiving motion from a crank, $z^4$, mounted on the brush-shaft. As the shaft revolves the brush will reciprocate, and, in order to prevent unequal wear, I mean to attach the arm $z$ to the brush or its sleeve by set-screws, so as to be able to change its angular position with respect to the brush, and thus bring at will different parts of the brush into action.

I intend also at times to use a sweep or brush with rows of bristles separated by spaces, as shown in Fig. 7, and such a brush when rotating has pretty much the same effect as an oscillating brush. The disk $h$ is mounted on a shaft, $h'$, on the lower end of which is secured a pulley, $h^2$, which is embraced by an india-rubber band, $h^3$, one end of which is fastened to the pulley, and the other end to the lower side of the frame $c$, the tendency of the spring being to turn the disk in the direction of the arrow thereon, and any kind of spring or weight serving the same purpose may be substituted therefor. Upon the frame is secured, by clasps $i\ i$, a slide, $i'$, from which projects a pin, $j$, which is embraced by a connecting-rod, $j'$. The end of this rod is slotted, (see Fig. 2,) and a pin, $k$, projecting from a cog-wheel, $k'$, which engages with a pinion, $k^2$, on the sweep or brush shaft, enters the slot. When the wheels are revolved, the pin $k$ causes the slide to vibrate, and the extent of vibration may be adjusted by a screw, $k^4$. A hooked impelling pawl, $l$, is mounted upon the slide, being pivoted in a fork whose shank is free to turn in the slide, so that the pawl can move to and from the disk and also upward and downward. A spring, $l'$, fastened to the slide and to the pawl, tends to force the hooked end upward and against the disk. A continuation of the disk has ratchet-recesses $m\ m$ cut in it, which are all, except the last, closed at top by a cam-shaped fillet or projection, $m'$, but the last recess extends up above the cam. A horn, $n$, projects from the continuation of the disk beyond the last recess, and a cam, $o$, projects downward from the disk outside of the piece $m'$. These recesses are equal in number to the spaces between the ribs, and on the other side of the disk similar recesses, $p\ p$, are cut, all covered at top by the fillet $m'$, except the last, which is partially covered. A holding-pawl, $q$, mounted in the frame itself, and with a fork and spring like those pertaining to the impelling-pawl, acts in these recesses and has lying above it a cam, $o'$, projecting downward and in all respects like the cam $o$. The disk itself has cut through it a slot, $x$, capable of receiving a column of screw-blanks and holding them by their heads.

The operation of all these parts is as follows: As the slide reciprocates it carries with it the impelling-pawl, which catches into the recesses in succession and turns the disk step by step with a pause when the slot is opposite each space between the ribs, and when the slot is in that position it is held there by the pawl $q$, and while thus turned the disk has rotated in a direction contrary to the arrow thereon winding up the belt-spring $h^3$. When the hooked impelling-pawl arrives at the last recess, or that next the horn $n$, the spring throws it up level with the fillet $m'$ into the position shown by red lines in Fig. 3, and as the hook moves to turn the disk the horn throws it out of the recess. Just at this time the spring on the holding-pawl $q$ throws it up out of the recess to a level with the cam or fillet $m'$, and the disk is thrown rapidly round in the direction of the arrow by its belt-spring, both pawls riding on the cam $m'$ until they are struck by the cams $o\ o'$, which, acting upon the tops of the pawls, force them down again, so that they again enter the recesses below the cam $m'$. The oscillations of the disk by the force of the spring is arrested by the horn $n$ bringing up against a stop, $n'$, attached to the frame, and the slot in the disk is then opposite the space between the ribs nearest the cog-wheels. The next rotation of the wheel moves the slot to the next rib space, and so on in succession till all are visited by the slot. Then the disk is again rotated by the spring back to the bringing up place, and while so rotating it passes the spaces so rapidly that no blanks enter the slot. At every alternate position of the slot it is in line both with a space between the ribs and a space in the forwarding-ways, hereinafter described, and thus distributes the blanks.

A series of inclined forwarding-ways, $y\ y$, constructed as such ways usually are, abut against the lower edge of the disk. These ways are mounted upon the same frame as the hopper and disk, and their lower ends are to be abutted against and be in line with stationary continuations, being inclined ways leading to machines in which some useful operations are to be performed upon the blanks, and these ways, including their continuations, I call "forwarding-ways." Each of these ways is provided with a swinging gate or shutter, as at $z$, so constructed, as clearly shown in the drawings, as either to close the entrance to the ways or to permit blanks to be distributed into them. When columns of blanks are arranged in the receptacle, they slide down by gravity and abut against and are stopped by the disk. When the slot in the disk arrives opposite the space between two ribs, the blanks therein are received by the slot in the disk. When the slot comes opposite any one of the ways, so that the slot in them makes a continuation of the slot in the disk, then the blanks contained in the disk slide into the forwarding-way that is in line with it, being distributed by the disk into the various ways. The oscillating disk, slotted as described, is therefore a receiving and distributing contrivance, and the slot may be covered by a cap, $x'$, to prevent blanks being thrown out by the jars to which the disk is subjected when it is stopped or started suddenly; and I prefer to make the spring $h^3$ a strong one and to cause the impelling-pawl to act by a blow, as the jars thus imposed on the disk will be felt by the machine and aid it in performing its operations.

Various modifications of the machinery imparting an oscillating motion to the receiving and distributing contrivance might be described and will doubtless suggest themselves to the ingenious mechanic. I consider any such modifications as equivalents so long as pawls, ratchet-teeth, and cams, aided by a spring or weight, impart to the distributer the requisite oscillating motions. I intend at times to use the arranger without a distributer, and to abut the forwarding-ways directly against the end of the bottom of the hopper, so that the channel-ways between the ribs and in the ways are continuous, and in that case I intend to curve or bend the ways so as to forward blanks to the various machines. I also intend at times to employ more ways than there are channels in the hopper, as I find by experience that the quantity of screws that the arranger will arrange is more than sufficient to supply as many machines as there are channels. In this latter case I shape the distributer like two segments, one of a large and the other of a smaller circle joined at their centers, the periphery of the larger segment working against the upper ends of the ways, and I so modify the motions of the distributer that it stops at the upper end of each one of the forwarding-ways.

I claim as of my own invention—

1. A receptacle having an inclined bottom composed of a series of ribs in combination with a sweep, the two being constructed and operating substantially as described, and constituting an arranging apparatus.

2. In combination with an arranging apparatus operating as described, a plate arranged as described for discharging unarranged blanks and preventing them from obstructing the operations of the apparatus, as specified.

3. In combination with an arranging apparatus constructed and operating substantially as described, an oscillating, receiving, and distributing apparatus acting substantially as set forth.

4. Imparting proper motions to an oscillating distributing apparatus by means of a spring, or its equivalent, an impelling-pawl, and cams, the whole acting as a combined contrivance, substantially as set forth.

5. In combination with an arranging apparatus substantially such as described, a series of forwarding-ways, the combination being and operating substantially as described.

6. Mounting an arranging apparatus whose bottom is composed of inclined ribs in such manner, substantially as described, that the inclination thereof may be varied for the purposes described.

7. In combination, forwarding-ways or a set or series thereof, an oscillating, receiving, and distributing apparatus, and an arranging apparatus, all operating substantially as described, whereby blanks may be arranged and distributed to several machines for performing useful operations thereon, substantially as hereinbefore set forth.

H. A. HARVEY.

In the presence of—
 JAS. S. WIGHTMAN,
 P. JAMES GAGE.